US010563610B2

(12) United States Patent
Hollar et al.

(10) Patent No.: US 10,563,610 B2
(45) **Date of Patent: *Feb. 18, 2020**

(54) METHODS AND SYSTEMS FOR DUAL FUEL INFECTION

(71) Applicant: Ford Global Technologies, LLC, Dearborn, MI (US)

(72) Inventors: Paul Hollar, Belleville, MI (US); Mary Catherine Farmer, Plymouth, MI (US); Ethan D. Sanborn, Saline, MI (US); Daniel Dusa, West Bloomfield, MI (US); Joseph Lyle Thomas, Holt, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,375

(22) Filed: Nov. 8, 2018

(65) Prior Publication Data

US 2019/0072051 A1 Mar. 7, 2019

Related U.S. Application Data

(60) Continuation of application No. 15/981,048, filed on May 16, 2018, now Pat. No. 10,156,201, which is a (Continued)

(51) Int. Cl.

| | |
|---|---|
| ***B60T 7/12*** | (2006.01) |
| ***F02D 41/30*** | (2006.01) |
| ***F02D 41/10*** | (2006.01) |

(52) U.S. Cl.
CPC ......... *F02D 41/3094* (2013.01); *F02D 41/10* (2013.01); *F02D 2200/60* (2013.01); *F02D 2200/602* (2013.01)

(58) Field of Classification Search
CPC ........... B60W 10/06; B60W 2510/0623; F02B 19/1052; F02D 2700/02; F02D 2200/06; F02D 2700/0271; F02D 2001/165; F02D 41/083; F02D 2041/2055; F02D 41/20
USPC ........ 701/101, 103, 104, 105; 123/429, 434, 123/681–683, 445, 446, 482, 478, 480, 123/406.11, 406.23, 406.24, 406.26, 123/406.29
See application file for complete search history.

(56) References Cited

U.S. PATENT DOCUMENTS 6,644,286 B2 11/2003 Kapolnek et al.
6,820,595 B2 11/2004 Kobayashi et al.
(Continued)

*Primary Examiner* — John Kwon
(74) *Attorney, Agent, or Firm* — Geoffrey Brumbaugh; McCoy Russell LLP

(57) ABSTRACT

Methods and systems are provided for reducing port injection fuel errors by selectively reactivating a direct fuel injector. Responsive to an increase in driver demand received while delivering fuel to a cylinder via port injection only, wherein the increase in driver demand is received late in the port injection window, the port injection error is addressed by reactivating a direct injector on the same engine cycle and delivering at least a portion of the fuel mass corresponding to the error via the direct injector. Additionally, a portion of the fuel mass may be delivered by the port injector on the same engine cycle by extending the end of injection timing, if possible.

20 Claims, 5 Drawing Sheets

Related U.S. Application Data division of application No. 15/156,047, filed on May 16, 2016, now Pat. No. 10,041,433.

(60) Provisional application No. 62/252,227, filed on Nov. 6, 2015.

(56) References Cited

U.S. PATENT DOCUMENTS

| | | | | |
|---|---|---|---|---|
| 7,694,666 | B2 | 4/2010 | Lewis et al. | |
| 8,275,538 | B2 | 9/2012 | Surnilla et al. | |
| 8,413,643 | B2 | 4/2013 | Pursifull et al. | |
| 10,041,433 | B2 * | 8/2018 | Hollar | F02D 41/3094 |
| 2016/0131072 | A1 | 5/2016 | Surnilla et al. | |
| 2016/0377018 | A1 * | 12/2016 | Sanborn | F02M 63/0285<br>123/457 |
| 2016/0377019 | A1 * | 12/2016 | Russ | F02D 41/3094<br>123/486 |
| 2017/0022917 | A1 * | 1/2017 | Thomas | F02D 41/062 |
| 2017/0130666 | A1 | 5/2017 | Hollar et al. | |
| 2017/0370320 | A1 | 12/2017 | Idogawa | |
| 2018/0051646 | A1 | 2/2018 | Ranga et al. | |
| 2018/0051647 | A1 | 2/2018 | Ranga et al. | |

* cited by examiner

METHODS AND SYSTEMS FOR DUAL FUEL INFECTION

CROSS REFERENCE TO RELATED APPLICATIONS

The present application is a continuation of U.S. patent application Ser. No. 15/981,048, entitled "Methods and Systems for Dual Fuel Injection," filed on May 16, 2018. U.S. patent application Ser. No. 15/981,048 is a divisional of U.S. patent application Ser. No. 15/156,047, entitled "Methods and Systems for Dual Fuel Injection," filed on May 16, 2016, now U.S. Pat. No. 10,041,433. U.S. patent application Ser. No. 15/156,047 claims priority to U.S. Provisional Patent Application No. 62/252,227, entitled "Methods and Systems for Dual Fuel Injection," filed on Nov. 6, 2015. The entire contents of the above-referenced applications are hereby incorporated by reference in their entirety for all purposes.

FIELD

The present description relates to systems and methods for adjusting operation of an internal combustion engine that includes high pressure port and direct fuel injectors.

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder. Direct fuel injection systems may improve cylinder charge cooling so that engine cylinders may operate at higher compression ratios without incurring undesirable engine knock. Port injection systems may reduce particulate emissions and improve fuel vaporization. In addition, port injection may reduce pumping losses at low loads. To leverage the advantages of both types of fuel injection, engines may also be configured with each of port and direct injection. Therein, based on engine operating conditions, such as engine speed-load ranges, fuel may be delivered via only direct injection, only port injection, or a combination of both types of injection.

The inventors herein have recognized potential issues that may occur when operating with only port injection. Specifically, when port injection is scheduled, fuel may be delivered via a port injector only within a defined window that starts shortly after an intake valve closes and ends just before, or shortly after, the intake stroke. If a tip-in occurs late in this cycle (e.g., towards a later part of the port injection window), the estimated air charge entering the cylinder will rise rapidly. An engine controller may react to this rise in estimated air charge by estimating a corresponding increase in fuel required to maintain stoichiometric engine operation. However, there may not be sufficient margin to enable the additional fuel to be delivered before the port fuel injection window ends. As a result of the port injection error, a lean combustion event may ensue, increasing the chance for engine misfires.

The inventors herein have recognized the above issues and developed a method for an engine to at least partly address some of the above issues. One example method includes: operating in a first mode with each of a port and a direct injector enabled, operating in a second mode with the port injector enabled and the direct injector disabled, wherein the direct injector is selectively re-enabled responsive to the port injection fuel error, the error then compensated via each of port injection and direct injection on a common combustion event; and operating in a third mode with the port injector enabled and the direct injector disabled, wherein the direct injector is selectively re-enabled responsive to the port injection fuel error, the error compensated via only direct injection on the common combustion event. In this way, stoichiometric engine operation is improved.

As one example, during conditions where only port injection is scheduled (e.g., low engine speed-load conditions), delivery of fuel pulses from cylinder direct injectors may be inhibited and a target fuel mass may be delivered via a cylinder port injector. In particular, the port injection may be scheduled with a start and end of injection timing within the port injection window. In response to a tip-in event occurring while the port injection is in progress, a controller may calculate an additional amount of fuel required to be delivered to maintain stoichiometric combustion. The controller may then determine if the additional fuel mass can be delivered by adjusting the port injection pulse width (e.g., by extending the end of injection timing) within the port injection window. If the fuel error cannot be compensated by adjusting the port injection pulse width, then the controller may selectively reactivate the direct injector coupled to the cylinder and enable the remaining fuel mass to be made up for via direct injection on the same engine cycle. For example, the controller may maintain the original port injection and provide the entirety of the fuel error via direct injection. Alternatively, a portion of the fuel error may be compensated via adjustments to the port injection pulse width, while a remainder of the fuel error is compensated via direct injection on the same engine cycle. Further still, if the additional fuel mass to be compensated via direct injection is lower than the minimum pulse width of the direct injector, the direct injector may be maintained disabled and the additional fuel mass may be compensated via port injection on the subsequent engine cycle, such as by increasing the pulse width of the port injector on the subsequent engine cycle.

In this way, lean combustion events triggered by a tip-in request received late within a port injection cycle can be reduced. The technical effect of enabling direct injection to be selectively re-enabled in response to a tip-in when originally operating with port injection only is that a late decision to increase fuel mass to a cylinder can be accommodated without degrading engine performance. In addition, by compensating a port injection fuel error via direct injection on the same engine cycle, the need for open valve injection from a port injector is reduced. In addition, the use of direct injection, while occurs during the intake or compression stroke, is that air-fuel mixture formation is improved as compared to when the fuel is delivered via open intake valve port injection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
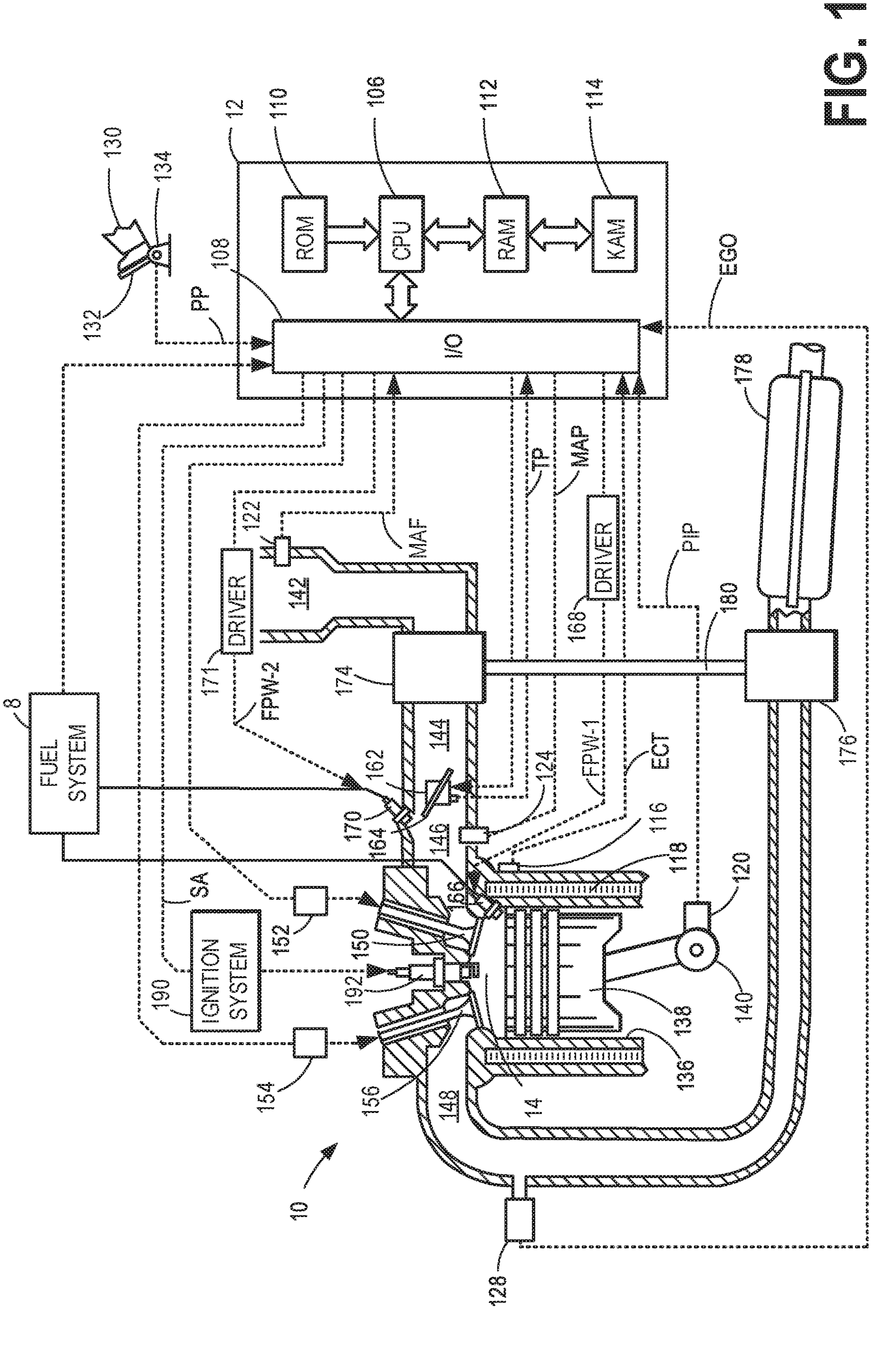
FIG. 1 schematically depicts an example embodiment of a cylinder of an internal combustion engine.
Figure 4:
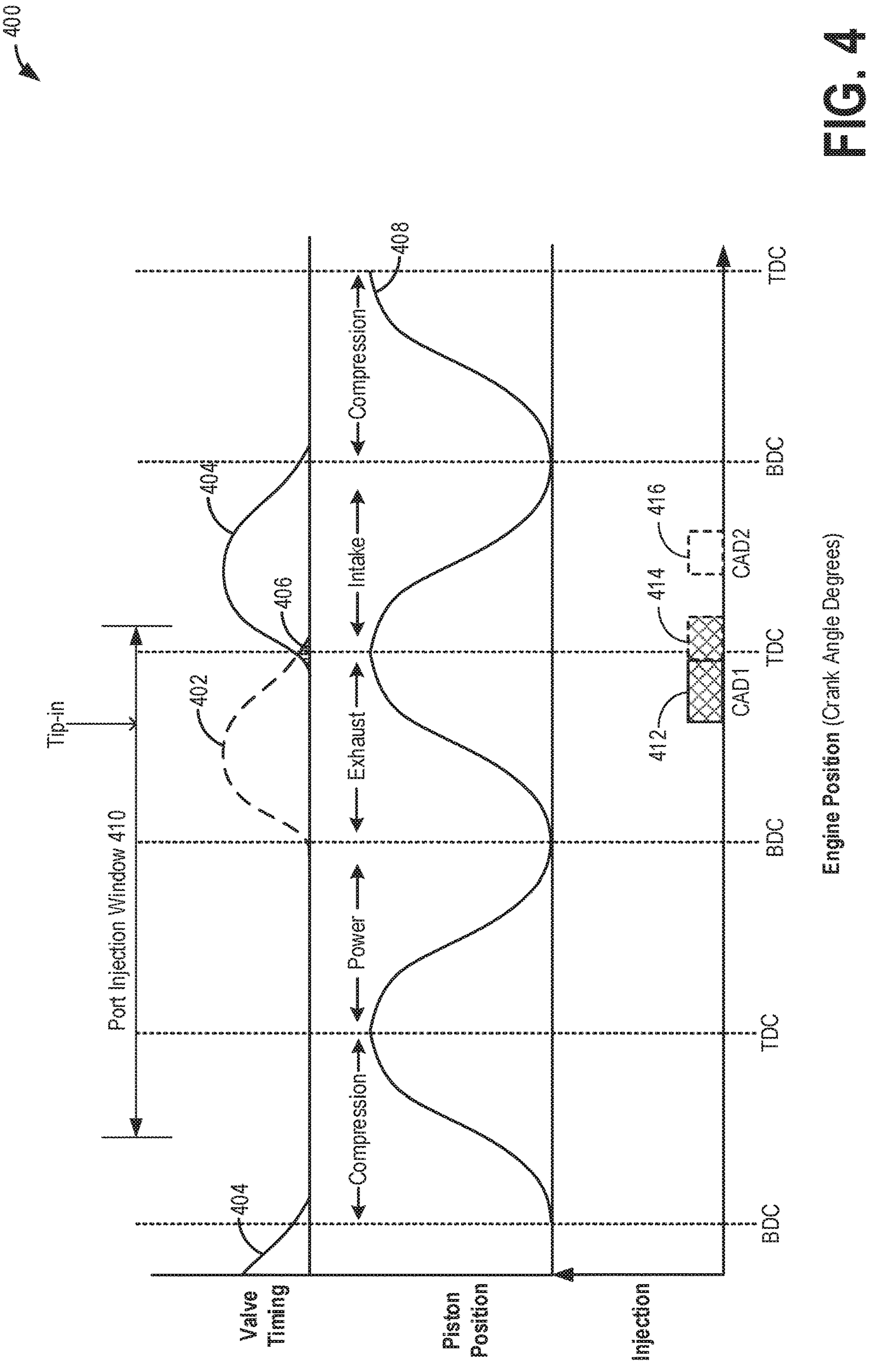
FIGS. 4-5 show example fuel injection profiles according to the present disclosure.
Figure 5:
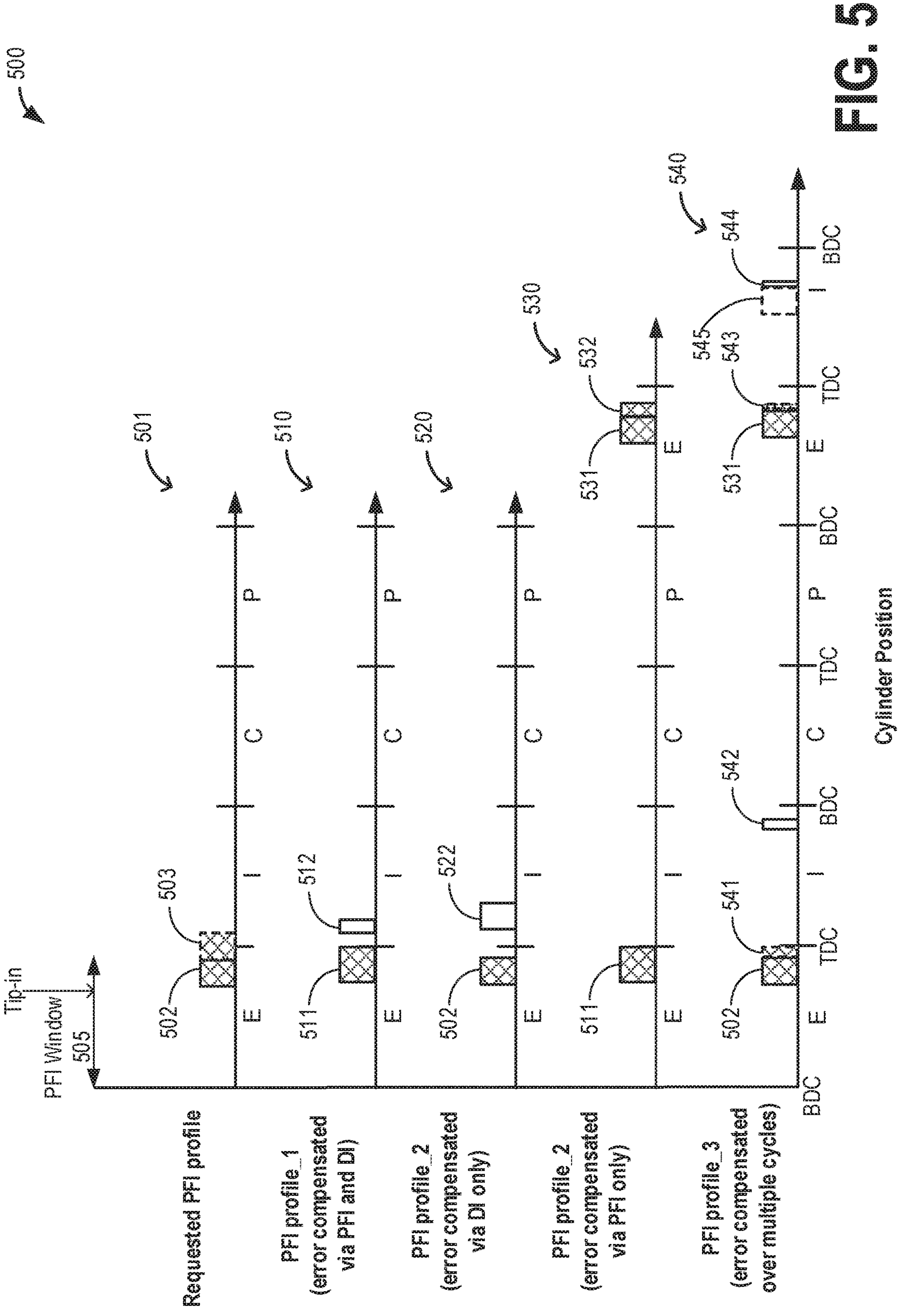

The following detailed description provides information regarding selective use of direct injection to reduce lean combustion during a tip-in when running a dual injection system engine in a port injection only mode. An example embodiment of a cylinder in an internal combustion engine configured for each of port and direct injection is shown at FIG. 1. The engine may receive fuel via the port and/or the direct injector based on a region of engine operation within a speed-load map, such as the map of FIG. 2. The controller may be configured to perform a control routine, such as the example routine of FIG. 3, to compensate a fuel error incurred due to a tip-in when running in a port injection only mode by selectively reactivating direct injection and delivering the remaining fuel mass via direct injection. Example fuel injection error compensations using direct and/or port injection are shown at FIGS. 4-5.

Regarding terminology used throughout this detailed description, port fuel injection may be abbreviated as PFI while direct injection may be abbreviated as DI. Also, fuel rail pressure, or the value of pressure of fuel within a fuel rail, may be abbreviated as FRP.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below with reference to the speed-load map of FIG. 2. The port injected fuel may be delivered during an open intake valve event, closed intake valve event (e.g., substantially before the intake stroke), as well as during both open and closed intake valve operation. As such, by delivering port injected fuel during a closed intake valve event, air-fuel mixture formation is improved (as compared to during open intake valve operation). Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. An example control routine is described herein with reference to FIG. 3.

Figure 2:
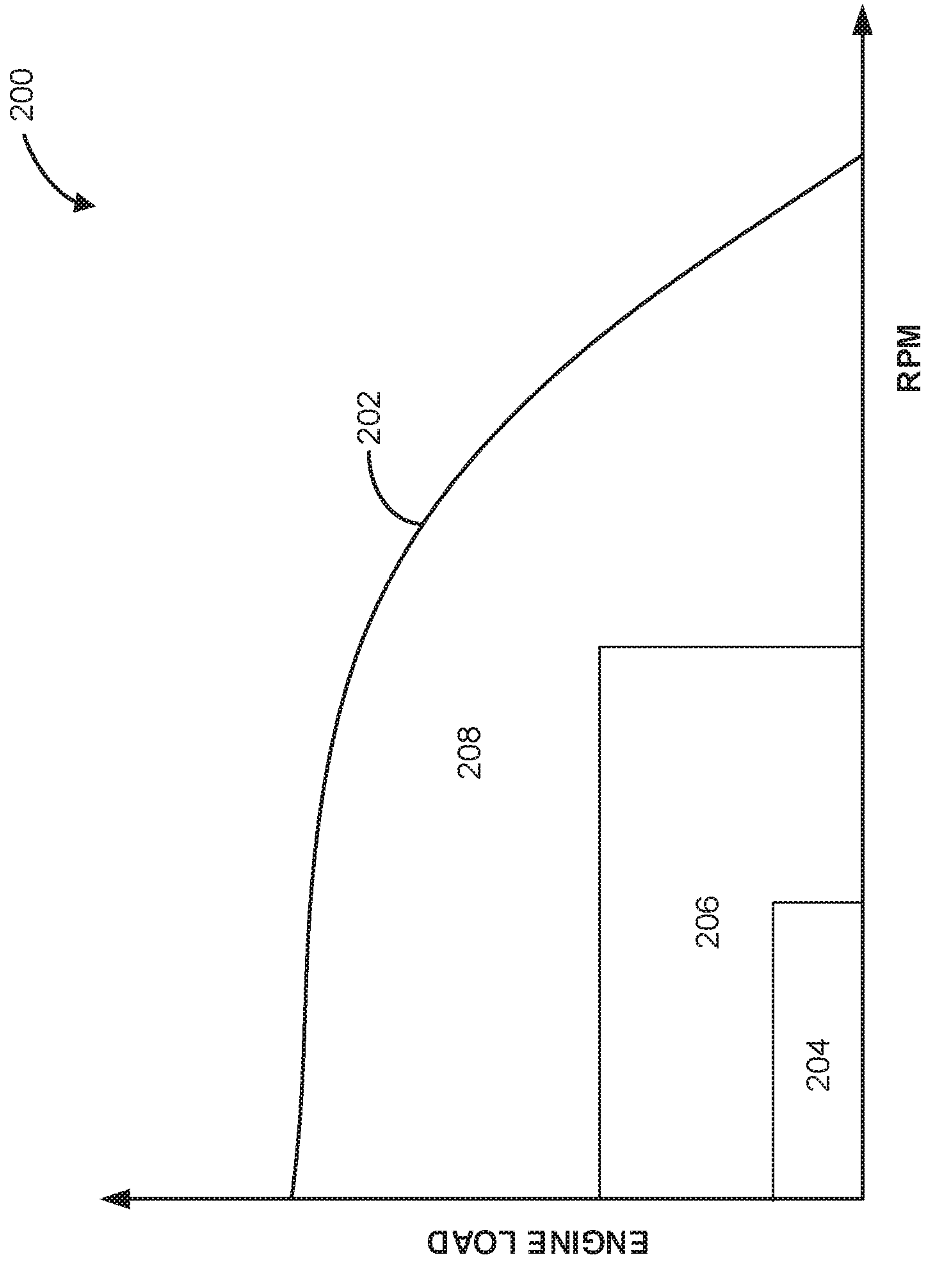
FIG. 2 shows an example engine speed-load map for identifying regions of port and/or direct injection operation.

FIG. 2 depicts an example speed-load map 200 that may be referred to by an engine controller to schedule port and/or direct injection. The map may be stored in the controller's memory and retrieved when fuel injection is to be scheduled. The map depicts engine speed along the x-axis (RPM) and engine load along the y-axis.

During low engine speed-load conditions, including during an engine start or restart condition, the engine may be operated in region 204 of the map wherein fuel is delivered via port injection only. Therein, the total fuel mass is delivered to a cylinder via a port injector only while a cylinder direct injector is inhibited from delivering any fuel pulses. By using only port injection during these conditions, fuel vaporization is improved and particulate emissions are reduced.

During high engine speed-load conditions, the engine may be operated in region 208 of the map wherein fuel is delivered via direct injection only. As shown, region 208 is bordered on the upper end by peak torque limit 202. When operating in this region, the total fuel mass is delivered to a cylinder via a direct injector only while a cylinder port injector is inhibited from delivering any fuel pulses. By using only direct injection during these conditions, charge cooling properties of the injection are leveraged to improve fuel economy and reduce knock.

During mid-range engine speed-load conditions, the engine may be operated in region 206 of the map wherein fuel is delivered via each of port and direct injection. When operating in this region, a portion of the total fuel mass is delivered to a cylinder via a direct injector while a remaining portion of the total fuel mass is delivered to the cylinder via a port injector. A ratio of fuel delivered to the cylinder via direct injection relative to port injection may be determined based on various factors including engine temperature, catalyst temperature, fuel octane, engine knock propensity, etc. By using each of direct and port injection during these conditions, the charge cooling properties of the direct injection are combined with the improved fuel vaporization properties of the port injection to enhance engine performance.

Figure 3:
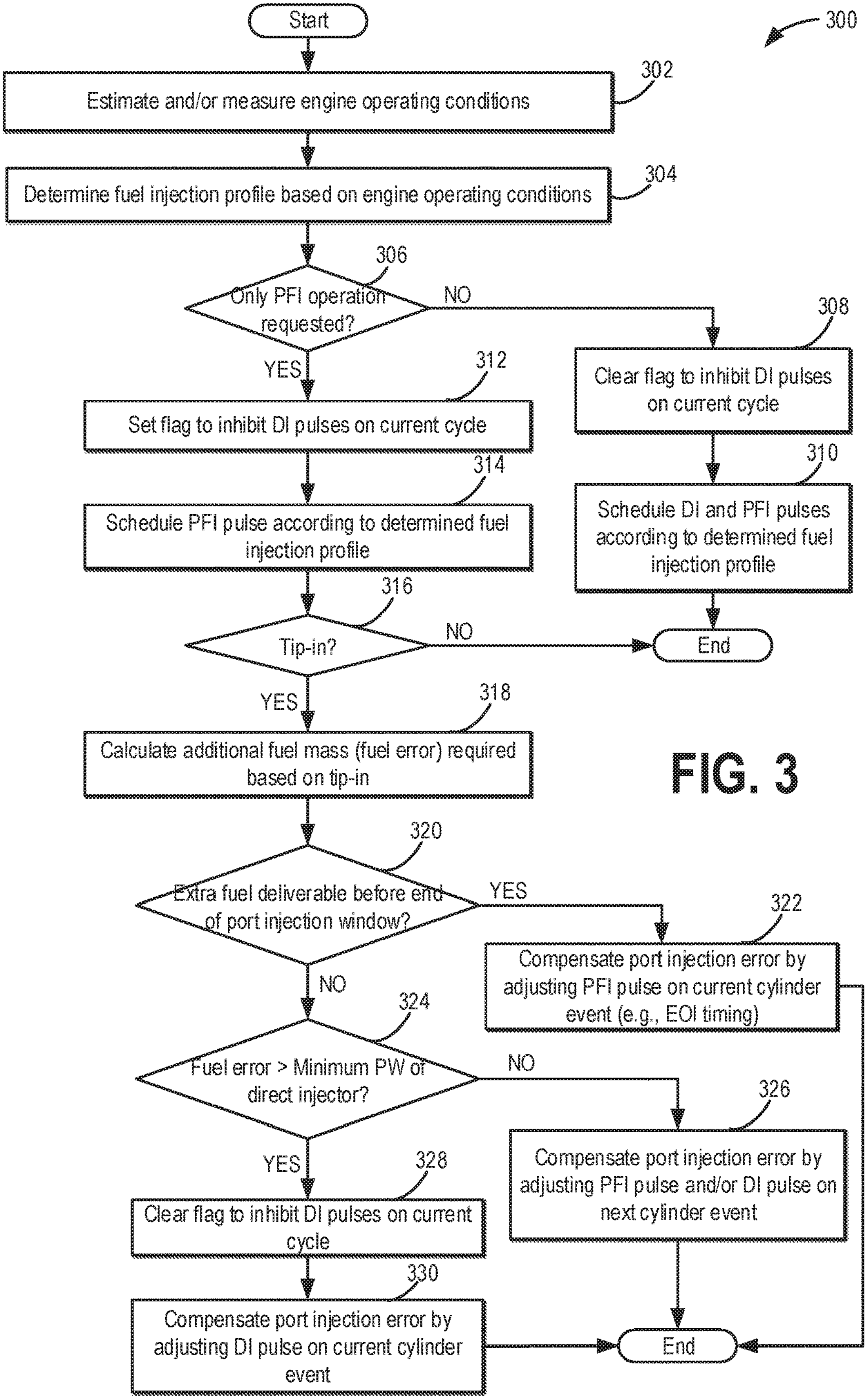
FIG. 3 shows a flow chart of an example method for compensating a port injection fuel error in a cylinder with direct injection.

Turning now to FIG. 3, an example method 300 is shown for adjusting fuel injection from a direct injector to reduce lean combustion during a tip-in when running an engine in a port injection only mode. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the method includes estimating and/or measuring engine operating conditions. These include, for example, engine speed, torque demand, engine temperature, EGR demand, manifold pressure, ambient conditions, etc. At 304, based on the estimated engine operating conditions, a fuel injection profile may be determined. This includes determining a total fuel mass to be delivered to a cylinder over an engine cycle, a timing of the injection, and further whether the fuel is to be delivered via direct injection only, port injection only, or each of port and direct injection. For example, the controller may refer to a map, such as the map of FIG. 2, to determine whether to operate with direct injection only, port injection only, or each of port and direct injection. Further, when each of port and direct injection is required, the controller may determine a ratio of the total fuel mass to be delivered via port injection relative to direct injection.

At 306, the method includes confirming if only port fuel injection (PFI) is required. In one example, only port fuel injection may be required when the engine is operating at low engine speed-load conditions, such as in region 204 of FIG. 2. If only port injection is not required, that is at least some (or only) direct injection is required, then at 308, the method includes clearing a flag that inhibits DI fuel pulses on the current engine cycle. In other words, direct injection of fuel is enabled. In addition, at 310, DI and PFI (if required) fuel pulses are scheduled according to the fuel injection profile determined at 304.

If only port injection is required, then at 312, the method includes setting a flag that inhibits DI fuel pulses on the current engine cycle. In other words, direct injection of fuel is selectively disabled. Next, at 314, the PFI fuel pulse is scheduled according to the determined fuel injection profile. Specifically, fuel may be delivered via the port injector within a port injection window that allows for closed intake valve fuel injection. The port injection window may begin shortly after the intake valve closes and may continue until just before the intake stroke begins, or shortly thereafter. As one example, the port injection window for a cylinder event may start in the exhaust stroke of the immediately preceding cylinder event.

At 316, it may be determined if there is a transient increase in driver demanded torque, such as if a tip-in has occurred late in the cycle. In particular, it may be determined if the tip-in request is received late within the port injection window (while the cylinder is receiving fuel via port injection). In one example, a tip-in may be confirmed in response to an operator applying an accelerator pedal. If a tip-in request is not received, the routine ends and exits with fuel being delivered to the cylinder via port injection as scheduled.

If a tip-in is requested, at 318, the method includes calculating an additional amount of fuel required based on the tip-in. As such, the tip-in may signal an operator request for increased torque. As the amount of torque demanded responsive to the tip-in increases, the amount of additional fuel required may correspondingly increase. In particular, in response to the tip-in, a throttle opening may be increased and intake aircharge may increase. In response to the increase in estimated aircharge, the controller may calculate an amount of extra fuel (herein also referred to as an additional fuel mass or a fuel error) that is required based on the increased aircharge to maintain stoichiometric combustion. As such, if the additional fuel were not provided, the increased aircharge would result in a lean combustion event, increasing the cylinder's propensity for misfire events.

At 320, it may be determined whether the additional fuel mass can be delivered before the end of the port injection window. In other words, it may be determined if the additional fuel mass can be delivered via port injection only on the same cycle. In one example, the controller may determine a revised port injection fuel pulse width, including a revised (extended) end of injection timing that would be required to deliver the additional fuel on the current port injection fuel pulse. If the revised port injection fuel pulse's revised engine of injection timing is within the port injection window, then the extra fuel may be deliverable within the port injection window and at 322, the method includes compensating the port injector fuel error by adjusting the port injection fuel pulse width. This may include extending the end of injection (EOI) timing of the port injection fuel pulse. As such, if the tip-in request is received early within the port injection window, and/or if the additional fuel mass required is smaller (such as during a smaller tip-in), the fuel error can be accommodated and compensated for via port injection only and the direct injectors can be maintained disabled.

In some examples, instead of determining if an entirety of the additional fuel mass can be delivered by revising the port fuel injection pulse width on the current cycle, it may be determined if at least a portion of the additional fuel mass can be delivered by revising the port fuel injection pulse width on the current cycle. For example, the controller may determine a revised port injection fuel pulse width including a revised (extended) end of injection timing that extends till an end of the port fueling injection window and then calculate an amount of fuel mass that the extension of the injection timing corresponds to. The controller may then calculate a portion of the additional fuel mass that can be delivered by extending the port injection pulse width and a remaining portion of the additional fuel mass that remains to be delivered. As elaborated below, the remaining portion may then be delivered via direct injection on the same cycle, or via port and/or direct injection on the subsequent cycle.

If the extra fuel cannot be delivered before the end of the port injection window, such as when the additional fuel mass is larger (such as during a larger tip-in), or when the tip-in request is received late within the port injection window, then at 324, it is determined if the additional fuel mass (fuel error) that needs to be added is larger than a minimum pulse width of the direct injector. As such, if the fuel error is smaller than the minimum pulse width of the direct injector, it may not be deliverable via the direct injector. If the fuel error cannot be compensated via adjustments to the port injection fuel pulse, or via a direct injection fuel pulse, then at 326, the method includes compensating for the fuel error induced by the tip-in via fuel injection adjustments on a subsequent cylinder event (e.g., on the immediately subsequent cylinder event with no cylinder events in between). This may include adjusting a PFI fuel pulse and/or a DI fuel pulse on the immediately subsequent cylinder event. In one example, where the engine is still operating in a port injection only mode, the fuel error may be compensated by extending the pulse width of the subsequent PFI fuel pulse based on the fuel error. Alternatively, where the engine is still operating in a port injection only mode, the fuel error may be compensated by adding a direct injection fuel pulse based on the fuel error. Further still, where the engine is operating in a direct injection only, or port and direct injection combination mode, the fuel error may be compensated by extending the pulse width of a subsequent DI fuel pulse based on the fuel error. It will be appreciated that herein the DI pulse is a fuel pulse delivered via direct injection on a different engine cycle as compared to the original PFI pulse during which the tip-in request was received.

Returning to 324, if the additional fuel mass (fuel error) that needs to be added is larger than the minimum pulse width of the direct injector, then at 328, the method includes clearing the flag that inhibits DI pulses on the current cycle. In other words, direct injection is selectively re-enabled. At 330, following the re-enablement of the direct injectors, the fuel error in port fuel injection is compensated for by adjusting a DI fuel pulse. In one example, this includes maintaining the original PFI fuel pulse and delivering the entirety of the fuel error via a DI pulse. Alternatively, the compensating may include delivering a portion of the fuel error via adjustment to the original PFI fuel pulse while maintaining the PFI fuel pulse within the PFI window (as described earlier), and delivering a remaining portion of the fuel error via a DI pulse. For example, the controller may adjust the proportioning of the additional fuel mass so that the amount delivered on the DI pulse is at or above the minimum pulse width of the direct injector while a remaining portion of the additional fuel mass is delivered by extending the pulse width of the port injector within the port injection window of the same event. It will be appreciated that herein the DI pulse is a fuel pulse delivered via direct injection on the same engine cycle as the original PFI pulse. For example, the PFI fuel pulse may be delivered during an exhaust stroke while the DI pulse may be delivered during an immediately subsequent intake stroke or compression stroke.

In this way, responsive to a tip-in requested while an engine is fueled via port injection only, a port injection fuel error may be compensated for by selectively reactivating a direct injector. This reduces the likelihood of the combustion event becoming enleaned, and the propensity for engine misfire events.

Turning to FIGS. 4-5, example fuel injection profiles elaborating the details of a fuel error compensation are shown. FIG. 4 explains the fuel error in the context of a port injection window while FIG. 5 depicts example fuel compensation modes.

Map 400 of FIG. 4 illustrates an engine position along the x-axis in crank angle degrees (CAD). Curve 408 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 408, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 402 and 404 depict valve timings for an exhaust valve (dashed curve 402) and an intake valve (solid curve 404) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 406 (or simply, positive valve overlap), represented by a hatched region at the intersection of curves 402 and 404. In one example, the positive intake to exhaust valve overlap 406 may be a default cam position of the engine present during an engine cold start.

A port injection window 410 is shown with relation to the different strokes of the engine cycle as well as with reference to a position of the intake valve. In particular, port injection window 410 starts just after the intake valve closes. Herein, port injection window 410 allows for closed intake valve fuel injection. By delivering fuel on a closed intake valve, fuel metering is improved.

The third plot (from the top) of map 400 depicts an example fuel injection profile that may be used while operating an engine with only port injection enabled (that is, with direct injection disabled). Herein, during selected conditions, such as low engine speed-load conditions and engine starts, fuel may be port injected into a cylinder as PFI fuel pulse 412 (hatched black) at CAD1. In particular, fuel may be injected within port injection window 410. In the depicted example, the fuel is port injected on a closed intake valve during an exhaust stroke.

If a tip-in occurs during the port injection, and later within the port injection window 410 (such as at or around CAD1), an engine controller may increase the opening of an intake throttle to increase the amount of intake aircharge inducted. At the same time, an additional amount of fuel that needs to be added based on the increased aircharge, herein represented as fuel error 414, is determined. In the present example, fuel error 414 is larger and due to the tip-in being requested later in the port injection window 410, fuel error 414 cannot be provided before the end of port injection window 410. Specifically, to compensate for the fuel error 414, an open intake valve port injection would be required. Instead of providing the additional fuel mass as an open intake valve port injection, the fuel error 414 may be addressed by enabling a direct injection fuel pulse 416 at CAD 2, later in the same engine cycle while maintaining PFI fuel pulse 412 as originally determined. By compensating for the port injection fuel error via a direct injection fuel pulse, mixture formation is improved.

Still other combinations of port and direct injection fuel pulses may be used, as elaborated with reference to FIG. 5. In particular, map 500 depicts example fuel injection profiles 510, 520, 530, and 540 that may be used to compensate for a port injection fuel error induced by a tip-in received during a port injection window while operating an engine with port injection only. The different fuel injection profiles may be selected based on different operating modes of the engine system. Herein, port injection pulses are represented by hatched blocks while direct injection pulses are represented by solid blocks. In each case, the engine is originally operating with port injection only.

As reference, a requested PFI profile 501 is first illustrated. The requested PFI profile 501 includes an original PFI pulse 502 within a port injection window 505. In response to a tip-in event received later within PFI window 505, an additional PFI fuel mass, herein referred to as fuel error 503, may be requested to avert a lean combustion event. However, the delivery of fuel error 503 would require an undesirable open intake valve port injection.

In one example, the port injection error may be compensated for via a first injection profile 510. Injection profile 510 may be applied when the engine is operating in a first mode with only the port injector enabled. Therein, in response to fuel error 503, the direct injector may be selectively re-enabled (e.g., for that cycle only). In addition, a portion of fuel error 503 is delivered by extending the original PFI pulse while maintaining the closed intake valve port injection within port injection window 505, as indicated by updated PFI pulse 511 (which is larger than original PFI fuel pulse 502). A remaining portion of fuel error 503 is then delivered as a DI pulse 512, wherein DI pulse 512 is at or above the minimum pulse width of the direct injector. On a subsequent combustion event, only port fueling of a cylinder may be resumed and the direct injector may be disabled.

In another example, the port injection error may be compensated for via a second injection profile 520. Injection profile 520 may be applied when the engine is operating in a second mode with only the port injector enabled. Therein, in response to fuel error 503, the direct injector may be selectively re-enabled (e.g., for that cycle only). In addition, all of fuel error 503 is delivered as a DI pulse 522 while maintaining the original port injection fuel pulse 502 within port injection window 505. Herein, DI pulse 522 is at or above the minimum pulse width of the direct injector. On a subsequent combustion event, only port fueling of a cylinder may be resumed and the direct injector may be disabled.

In yet another example, the port injection error may be compensated for via a third injection profile 530. Injection profile 530 may be applied when the engine is operating in a third mode with only the port injector enabled. Therein, in response to fuel error 503, the direct injector may be maintained disabled. For example, this may be due to fuel error 503 (or a portion of fuel error 503 desired to be delivered as a DI pulse) being smaller than the minimum pulse width of the direct injector. In addition, due to it not being possible to deliver fuel error 503 as a PFI pulse before the end of port injection window 505, fuel error 503 is delivered on a subsequent engine cycle. In particular, original PFI pulse 502 is maintained and original PFI pulse 531 for the next combustion event is adjusted with an extension 532 to compensate for fuel error 503.

In yet another example, the port injection error may be compensated for via a fourth injection profile 540. Injection profile 540 may be applied when the engine is operating in a fourth mode with only the port injector enabled. Therein, in response to fuel error 503, the direct injector may be selectively re-enabled for that cycle and optionally also the subsequent cycle. For example, a first portion of the fuel mass for fuel error 503 may be delivered by extending the original PFI pulse while maintaining the closed intake valve port injection within port injection window 505, as indicated by extension 541 added to original PFI pulse 502. A second portion of the fuel mass for fuel error 503 is then delivered as DI pulse 542, wherein DI pulse 542 is at or above the minimum pulse width of the direct injector. A third portion of the fuel mass for fuel error 503 is then delivered during the on the subsequent engine cycle by adjusting original PFI pulse 531 for the next combustion event with an extension 543. During conditions where direct injection was not scheduled for this combustion event, the direct injector may be reactivated for this cycle and a fourth portion of the fuel mass for fuel error 503 may be delivered as DI pulse 544 (on the same combustion event as fuel pulse 531 and extension 543), wherein DI pulse 544 is at or above the minimum pulse width of the direct injector. On a subsequent combustion event, only port fueling of a cylinder may be resumed and the direct injector may be disabled. Alternatively, during conditions where direct injection was scheduled for this combustion event as DI fuel pulse 545, the fourth portion of the fuel mass for fuel error 503 may be delivered as extension 544 to DI pulse 545.

It will appreciated that while profile 540 depicts the fuel mass spread over 4 pulses/extensions, in alternate examples, the fuel error may be compensated by a combination of PFI and DI pulses on the original combustion event and the immediately subsequent combustion event. For example, a first and second portion of the fuel error may be compensated via port and direct injection on the same event, respectively, while a remainder of the fuel error is compensated for by only port injection or only direct injection on the next event.

It will be appreciated that while profiles 510 and 520 depict the DI fuel pulse to be in the intake stroke, in alternate examples, the DI fuel pulse may be provided in the compression stroke. Further still, for all the depicted profiles, the fuel error may be provided as multiple DI pulses in the intake and/or compression stroke of the given engine cycle instead of as a single DI pulse (as depicted).

In still other examples, where the tip-in is received while delivering fuel via port injection but while operating the engine with each of a port and a direct injector enabled, the port fuel injection error may be compensated by the already enabled direct injector on the same engine cycle.

In this way, lean combustion events triggered by port injection fuel errors can be reduced. The technical effect of selectively re-enabling a direct injector in response to an increased driver demand received late during a port injection window (while operation with port injection only) is that fuel mass can be increased on the same engine cycle, reducing air-fuel ratio errors. By reducing the likelihood of a lean event due to the port injection error, misfire incidence is reduced. By reducing the need for open valve injection from a port injector, engine performance is improved and engine emissions are reduced.

As one example, a method for an engine comprises: operating in a first mode with each of a port and a direct injector enabled, wherein a port injection fuel error is compensated via fuel injection via the direct injector; operating in a second mode with the port injector enabled and the direct injector disabled, wherein the direct injector is selectively re-enabled responsive to the port injection fuel error, the error then compensated via each of port injection and direct injection on a common combustion event; and operating in a third mode with the port injector enabled and the direct injector disabled, wherein the direct injector is selectively re-enabled responsive to the port injection fuel error, the error compensated via only direct injection on the common combustion event. In the preceding example, additionally or optionally, when operating in the third mode, the port injection fuel error is higher than a threshold, and wherein the direct injector is maintained disabled responsive to the port injection fuel error being lower than the threshold, and the lower than threshold error is compensated via one or more of port and direct injection on an immediately subsequent combustion event with no intervening combustion events in-between. In any or all of the preceding examples, additionally or optionally, the port injection fuel error is responsive to a tip-in received within a port injection fueling window while fueling the engine via only port injection on the common combustion event. In any or all of the preceding examples, additionally or optionally, the tip-in is received closer to an end of the port injection fueling window during the third mode as compared to the second mode. In any or all of the preceding examples, additionally or optionally, the method further comprises selecting between the modes based on a timing of the tip-in relative to an end of the port injection fueling window. In any or all of the preceding examples, additionally or optionally, the method further comprises further selecting between the modes based on the port injection fuel error relative to a minimum pulse-width of a direct injector. In any or all of the preceding examples, additionally or optionally, the method further comprises operating in a fourth mode with the port injector enabled and the direct injector disabled, wherein the direct injector is selectively re-enabled responsive to the port injection fuel error, the error then compensated via one or more of port injection and direct injection on an immediately subsequent combustion event. In any or all of the preceding examples, additionally or optionally, the method further comprises: operating in a fifth mode with the port injector enabled and the direct injector disabled, wherein the direct injector is selectively re-enabled responsive to the port injection fuel error, the error compensated via each of port and direct injection on the common combustion event, and port and direct injection on the immediately subsequent combustion event.

Another example method for an engine comprises: while fueling a cylinder via port injection only, in response to a transient increase in torque demand received later in a port fueling window of an engine cycle, selectively reactivating a direct injector coupled to the cylinder; and delivering at least a portion of an additional fuel mass required to meet the transient increase in torque demand via direct injection on the engine cycle. In the preceding example, additionally or optionally, the portion of the additional fuel mass delivered via direct injection is increased as a timing of the transient increase in torque demand approaches an end of the port fueling window. In any or all of the preceding examples, additionally or optionally, the portion of the additional fuel mass delivered via direct injection is greater than a minimum pulse-width of the direct fuel injector. In any or all of the preceding examples, additionally or optionally, a remaining portion of the additional fuel mass is delivered via port injection on said engine cycle when the timing of the transient increase in torque demand is more than a threshold distance from the end of the port fueling window, and delivered via port injection on an immediately subsequent engine cycle when the timing of the transient increase in torque demand is less than the threshold distance from the end of the port fueling window. In any or all of the preceding examples, additionally or optionally, the portion of the additional fuel mass delivered via direct injection is further based on the additional fuel mass relative to a minimum pulse-width of the direct fuel injector, the portion increased as the additional fuel mass exceeds the minimum pulse-width of the direct fuel injector. In any or all of the preceding examples, additionally or optionally, the portion of the additional fuel mass delivered via the direct injector is increased until a maximum pulse-width of the direct fuel injector is reached, and then a remaining portion of the additional fuel mass is delivered via port injection on an immediately subsequent engine cycle.

Another example engine fueling system comprises: an engine cylinder; a port injector; a direct injector; a pedal for receiving a driver torque demand; and a controller with computer-readable instructions for: in response to a transient increase in driver torque demand received while delivering fuel to the cylinder on an engine cycle via only the port injector, selectively increasing a pulse width of the direct injector on said engine cycle to meet at least a portion of the transient increase in torque demand. In any or all of the preceding examples, additionally or optionally, the pulse width of the direct injector is increased to meet an entirety of the transient increase in torque demand when a timing of the transient increase is less than a threshold distance from an end of a port injection fueling window, and when a fuel mass corresponding to the transient increase is between a minimum pulse width and a maximum pulse width of the direct injector. In any or all of the preceding examples, additionally or optionally, the controller includes further instructions for: selectively increasing a pulse width of the port injector on said engine cycle to meet a remaining portion of the transient increase in torque demand when a timing of the transient increase is more than a threshold distance from an end of a port injection fueling window. In any or all of the preceding examples, additionally or optionally, the controller includes further instructions for: selectively increasing a pulse width the port injector on an immediately subsequent engine cycle to meet a remaining portion of the transient increase in torque demand when a timing of the transient increase is more than a threshold distance from an end of a port injection fueling window. In any or all of the preceding examples, additionally or optionally, the controller includes further instructions for: selectively increasing a pulse width of the direct injector on an immediately subsequent engine cycle to meet a remaining portion of the transient increase in torque demand when a timing of the transient increase is more than a threshold distance from an end of a port injection fueling window. In any or all of the preceding examples, additionally or optionally, the controller includes further instructions for: selectively increasing a pulse width of the direct injector on said engine cycle and an immediately subsequent engine cycle when a fuel mass corresponding to the transient increase is higher than a threshold amount.

As another example, a method for an engine may comprise: operating in a first mode with each of a port and a direct injector enabled, wherein a port injection fuel error is compensated via fuel injection via the direct injector; operating in a second mode with the port injector enabled and the direct injector disabled, wherein the direct injector is selectively re-enabled responsive to the port injection fuel error, and the error is compensated via direct injection; and operating in a third mode with the port injector enabled and the direct injector disabled, wherein the direct injector is selectively re-enabled responsive to the port injection fuel error being higher than a threshold, and the higher than threshold error is compensated via direct injection. Herein, in the second mode, the direct injector is selectively re-enabled responsive to any port injection fuel error. Further, in the third mode, the direct injector is maintained disabled responsive to the port injection fuel error being lower than the threshold, and the lower than threshold error is compensated via one or more of port and direct injection on a subsequent combustion event.

In another representation, a method for an engine comprises: in response to a transient increase in torque demand received while fueling a cylinder via port injection only, delivering a portion of an additional fuel mass required to meet the transient increase via the port injector; and delivering a remaining portion of the additional fuel mass via a reactivated direct injector. Further, a ratio of the portion delivered via the port injector relative to the direct injector is based on a timing of the transient increase in torque demand relative to a delivery window of the port injector. The additional fuel mass corresponds to a fuel mass required to maintain combustion of the cylinder at or around stoichiometry.

In another representation, method for an engine comprises: while fueling a cylinder via port injection only, in response to a transient increase in torque demand received later in a port fueling window of an engine cycle, selectively reactivating a direct injector coupled to the cylinder; and delivering at least a portion of an additional fuel mass required to meet the transient increase in demand via direct injection. Herein, the portion delivered via direct injection is increased as a timing of the transient increase in torque demand approaches an end of the port fueling window.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:

in response to a transient increase in torque demand received while fueling a cylinder via port injection only, delivering a portion of an additional fuel mass required to meet the transient increase via the port injector; and delivering a remaining portion of the additional fuel mass via a reactivated direct injector.

2. The method of claim 1, wherein a ratio of the portion delivered via the port injector relative to the direct injector is based on a timing of the transient increase in torque demand relative to a delivery window of the port injector.

3. The method of claim 1, wherein the additional fuel mass corresponds to a fuel mass required to maintain combustion of the cylinder at or around stoichiometry.

4. The method of claim 1, wherein the portion of the additional fuel mass delivered via the port injector and the remaining portion of the additional fuel mass delivered via the direct injector are delivered on a same cycle as the transient increase in torque demand.

5. The method of claim 4, wherein delivering the portion of the additional fuel mass required to meet the transient increase via the port injector includes applying a revised port injection fuel pulse width having an extended end of injection timing to deliver the additional fuel mass on the same cycle.

6. The method of claim 5, wherein the end of injection timing is extended to an end of a port fueling injection window.

7. The method of claim 6, wherein the remaining portion of the additional fuel mass delivered via the direct injector is calculated based on the required additional fuel mass and an amount of fuel mass corresponding to the extended end of injection timing.

8. The method of claim 4, wherein the portion delivered via the port injector is delivered during an exhaust stroke and the remaining portion is delivered during an immediately subsequent intake stroke or compression stroke.

9. The method of claim 1, wherein the portion of the additional fuel mass delivered via the port injector is delivered on a same cycle as the transient increase in torque demand, and the remaining portion of the additional fuel mass delivered via the direct injector is delivered on a subsequent cycle following the same cycle.

10. The method of claim 1, wherein the remaining portion delivered via the reactivated direct injector is larger than a minimum pulse width of the direct injector.

11. The method of claim 1, wherein the delivering includes adjusting a proportioning of the portion delivered via the port injector relative to the remaining portion so that the remaining portion is at or above a minimum pulse width of the direct injector and the portion delivered via the port injector is delivered by extending a port injection window of a same cycle.

12. A method for an engine comprising:

while fueling a cylinder via port injection only, in response to a transient increase in torque demand received later in a port fueling window of an engine cycle, selectively reactivating a direct injector coupled to the cylinder; and delivering at least a portion of an additional fuel mass required to meet the transient increase in demand via direct injection.

13. The method of claim 12, wherein the portion delivered via direct injection is increased as a timing of the transient increase in torque demand approaches an end of the port fueling window.

14. The method of claim 12, wherein the delivering includes adjusting a proportioning of the additional fuel mass so that the portion of the additional fuel mass delivered via direct injection is at or above a minimum pulse width of the direct injector.

15. The method of claim 14, wherein the delivering further includes adjusting the proportioning so that a remaining portion of the additional fuel mass is delivered by extending the port injection window of the engine cycle.

16. The method of claim 14, wherein fueling the cylinder via port injection only includes delivering fuel in accordance with a port fuel injection pulse width, and wherein the delivering includes adjusting the proportioning so that a remaining portion of the additional fuel mass is delivered by revising the port injection pulse width to extend an end of injection timing to or towards an end of the port injection window of the engine cycle.

17. The method of claim 12, wherein the portion of the additional fuel mass delivered via direct injection is delivered on a different engine cycle as compared to the engine cycle wherein the transient increase in torque demand was received.

18. A method for an engine comprising:

in response to a transient increase in torque demand received on a cylinder event while fueling a cylinder via port injection only, delivering a portion of an additional fuel mass required to meet the transient increase via the port injector on the cylinder event; and delivering a remaining portion of the additional fuel mass via a reactivated direct injector on a different cylinder event.

19. The method of claim 18, wherein the different cylinder event is an immediately subsequent cylinder event with no cylinder events in-between.

20. The method of claim 18, further comprising, proportioning the portion delivered via the port injector relative to the remaining portion delivered via the direct injector so that the remaining portion is larger than a minimum pulse width of the direct injector, and wherein delivering the portion via the port injector includes extending an end of injection timing of a port injection fuel pulse width on the cylinder event towards an end of a port fueling injection window.

* * * * *